June 20, 1961 R. E. DILLBERG 2,989,080
ROTARY TRANSFER VALVE MECHANISM
Filed May 26, 1958 4 Sheets-Sheet 4
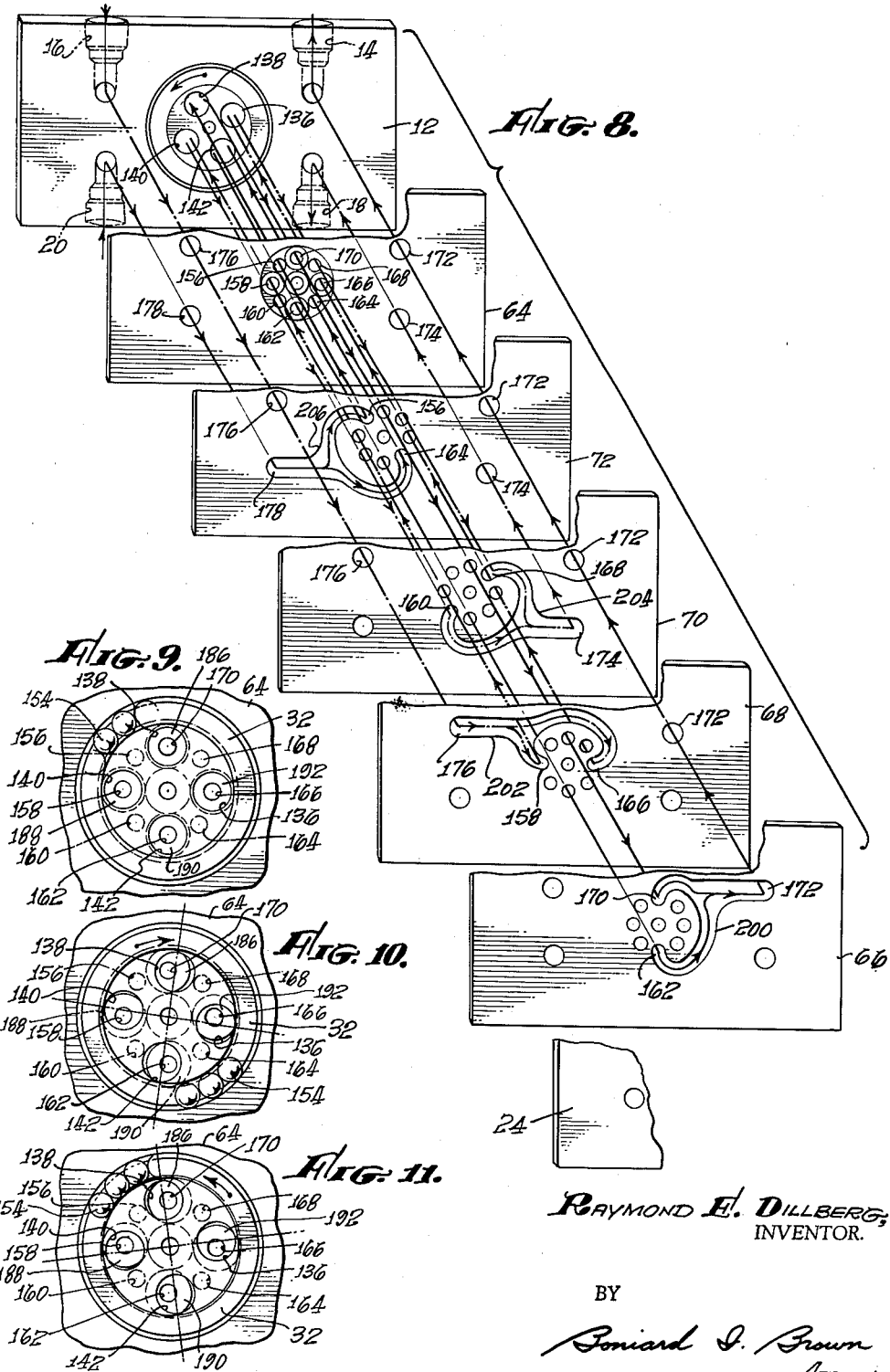
RAYMOND E. DILLBERG,
INVENTOR.
BY
Boniard I. Brown
ATTORNEY 2,989,080
Patented June 20, 1961

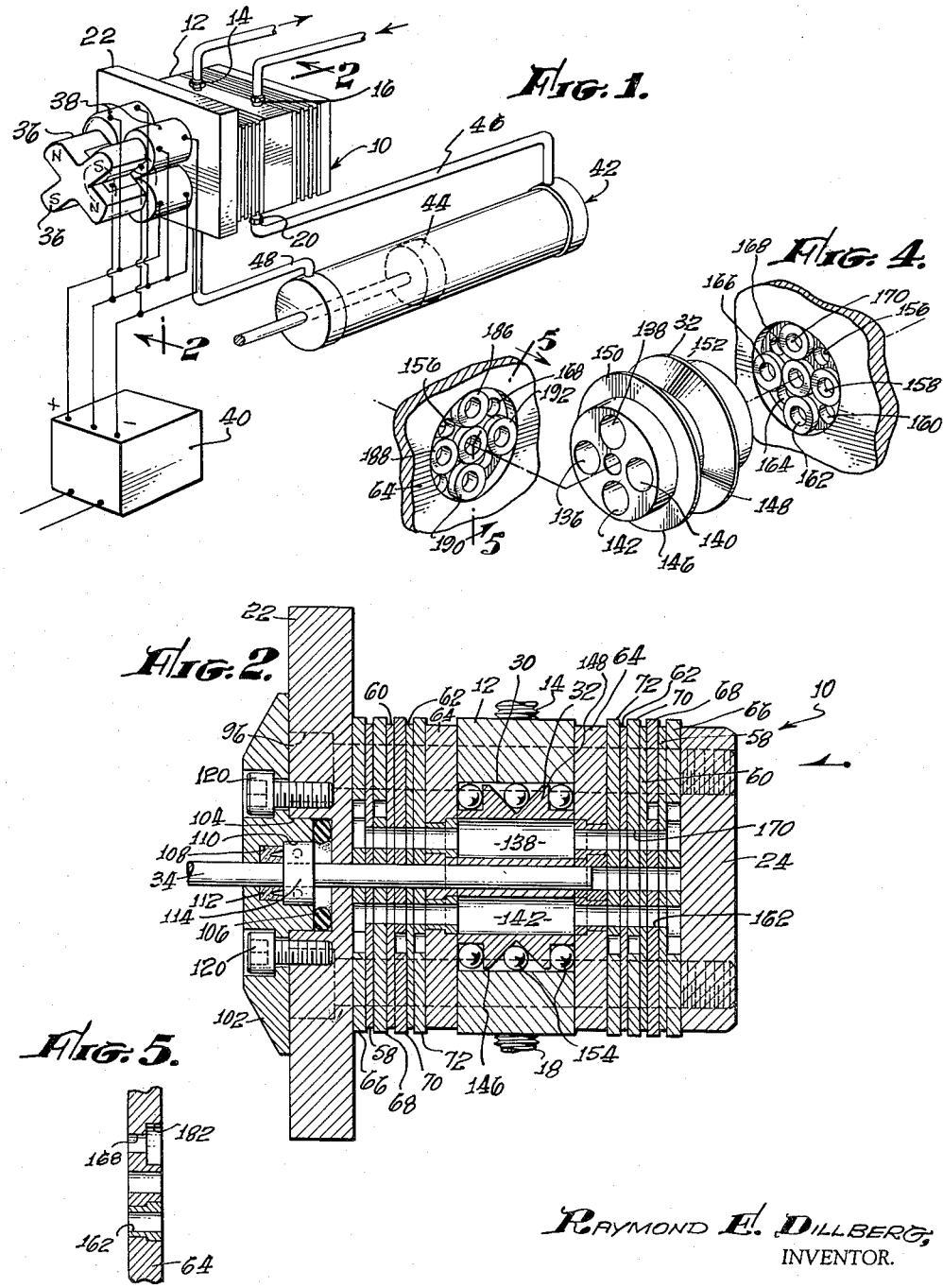

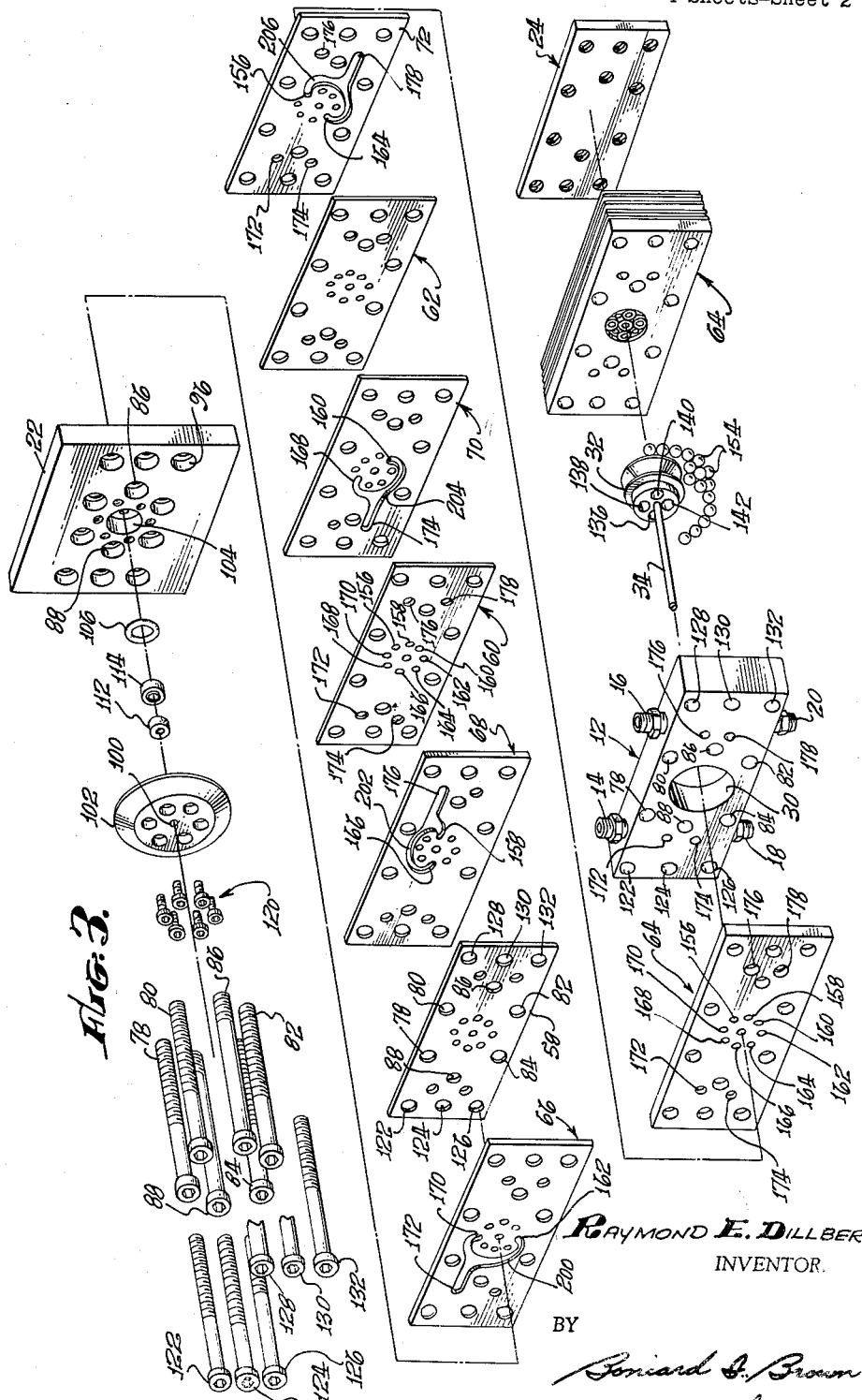

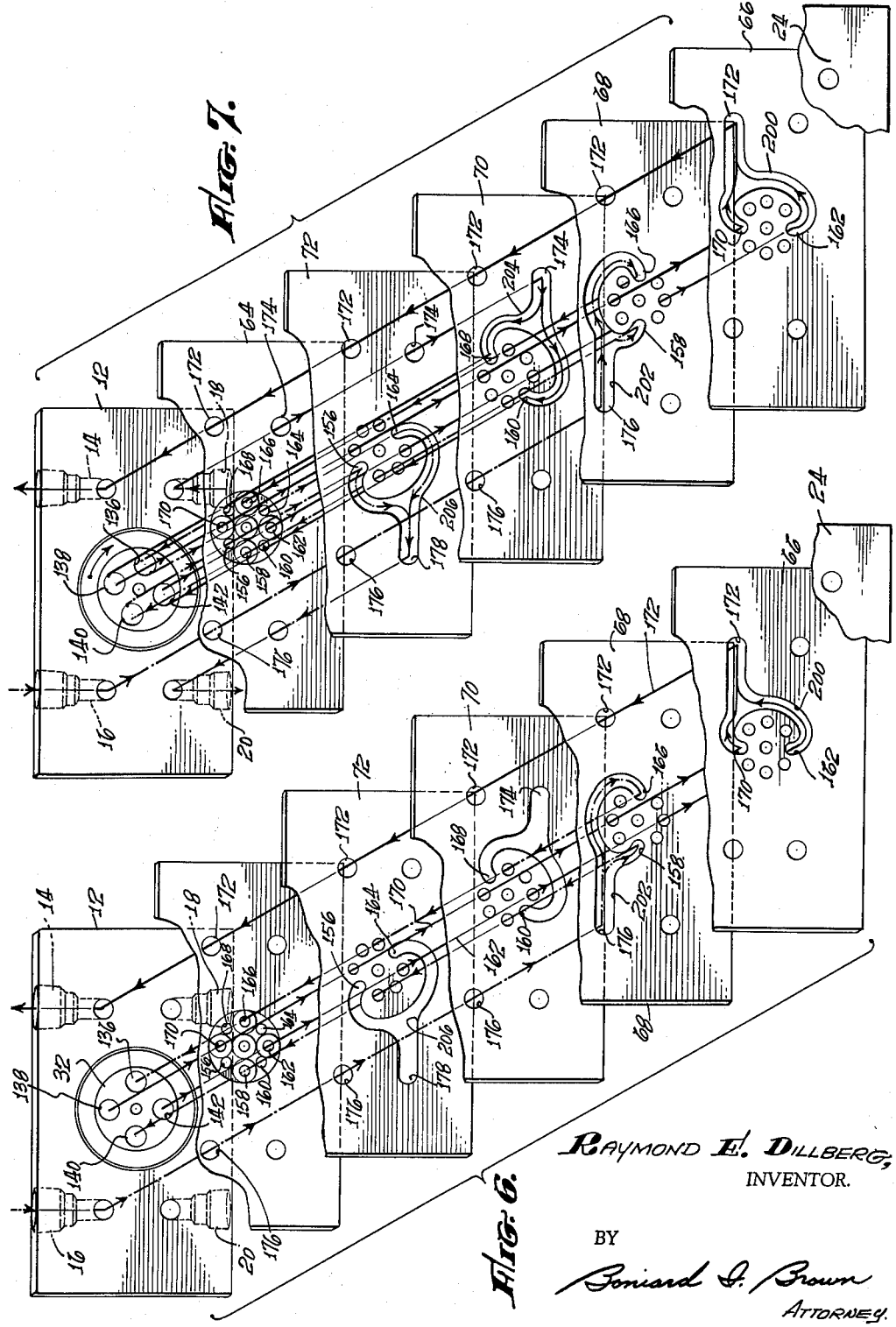

2,989,080
ROTARY TRANSFER VALVE MECHANISM
Raymond E. Dillberg, 6152 N. Encinita,
Temple City, Calif.
Filed May 26, 1958, Ser. No. 737,774
22 Claims. (Cl. 137—623)

This invention relates generally to an improved valve apparatus; more particularly it relates to novel features of a transfer valve for governing flow in response to input impulses.

An important feature of the present invention is a novel construction wherein a port in a rotor is registrable with a control element and wherein rotational movement of the rotor effects a valving action by coaction between the port periphery and the periphery of the control element. The relative positions of a plurality of such ports and control elements are varied in accordance with input intelligence in order to govern flow from the ports. A space is defined adjacent to each control element and a passage communicates with the space, so that free flow from the port to the passage results in movement of the port from registration with the element. Circular control elements and ports may be utilized, such a configuration resulting in an eclipsing action between each port and its corresponding control element when the rotor is turned. Flow is governed in accordance with the degree of partial eclipse between a port and its cooperating element. Smooth initiation or cessation of flow from the port at the control element is achieved when the port is moved into or out of eclipsing registration with the control element.

An important feature of the present invention is the balancing of forces on a rotor and the maintaining of the rotor in a floating condition. Forces on the rotor produced by pressures and flow are so balanced as to nullify each other axially and rotationally. The valve is therefore adapted for sensitive response to controlling forces or impulses. The balancing of forces is facilitated by a novel construction wherein each flow circuit to or from the valve is divided into parallel branches into the valve in such manner that forces on the rotor are balanced. Flow through each branch is governed by coaction between a rotor port and a control element in the manner mentioned above.

An important feature of the present invention is the mounting of the rotor by means of ball bearings in races defined between the rotor and parts adjacent to it. Rotational friction is minimized by axial and radial bearings thus provided. The rotor ports are disposed radially within the ball-bearing mounting and are therefore positioned only short distances from this mounting. A high degree of precision positioning of the rotor ports relative to their corresponding control elements is maintained under varying pressures, loadings and temperatures.

A valuable feature of this invention is a laminated and modular construction wherein a plurality of plates and members forms a valve body and wherein registering holes in the plates and members cooperate to define flow passages. The plates include alternately arranged manifold plates and separator plates. Each manifold plate has a bridging aperture for interconnecting certain of these flow passages. There is thus provided a high degree of lateral porting within a short axial distance. Multiple flow passages are provided in a valve of relatively small size. Passages are provided by manufacturing operations which are simpler and more economical than those which are necessary in providing passages in solid bodies. The plates and members are lapped and are clamped together, thereby providing pressure sealing without utilizing special sealing elements. The construction is modular because certain of the plates are identical and others are similar. Economy of production is thus achieved.

It is therefore an object of the present invention to provide a transfer valve adapted for sensitive response to input impulses.

An object of this invention is the provision of a valve apparatus utilizing simplified components and modular construction which adapt it for economical fabrication.

It is an object of this invention to provide a valve device capable of rapid initiation of relatively free flow.

An object of the present invention is to provide a valve device wherein flow from a port in a rotatable member is regulated by movement of the port relative to a control element registrable with the port.

It is an object of this invention to provide a valve apparatus which is substantially balanced axially and rotationally.

It is an object of the present invention to provide an improved valve apparatus which provides sensitive response to input impulses through the action on a rotor of pressures in symmetrically disposed passages to maintain the rotor in dynamic balance.

It is another object of this invention to provide a novel valve apparatus which utilizes laminations wherein registering holes define flow passages interconnected by apertures in certain of the laminations.

Another object of this invention is the provision of a novel valve apparatus wherein a rotor is mounted in a substantially floating condition by means of ball bearings disposed in races at the periphery of the rotor.

Another object of the present invention is to provide a valve device wherein a rotor is mounted by means of ball bearings in races at the rotor periphery to provide precision positioning of rotor ports relative to registrable control elements under varying conditions of pressure, loading and temperature.

Other objects and features of the present invention, as well as many advantages thereof, will become apparent to those skilled in the art from a consideration of the following description, the appended claims, and the accompanying drawings, wherein:

FIGURE 1 is a perspective view showing a transfer valve according to the present invention operatively connected with an hydraulic actuator and with electrical means for controlling the valve;

FIGURE 2 is an elevational sectional view taken at line 2—2 of FIGURE 1 along the central axis of the valve;

FIGURE 3 is an exploded perspective view showing elements of the transfer valve of FIGURES 1 and 2;

FIGURE 4 is an exploded perspective view showing details of the rotor and distributor plates utilized with the present invention;

FIGURE 5 is a fragmentary sectional view taken at line 5—5 of FIGURE 4;

FIGURES 6, 7 and 8 are exploded perspective views, each of which schematically illustrates the flow circuits corresponding to a particular rotational position of the rotor shown in FIGURES 2 and 4;

FIGURE 9 is a fragmentary elevational view of the distributor plate details shown in FIGURE 4; and FIGURES 10 and 11 are elevational views similar to that of FIGURE 9 which schematically illustrate positions of rotor ports corresponding to the rotational positions shown in FIGURES 7 and 8, respectively.

Referring to the drawings, and particularly to FIGURES 1, 2, 3 and 4, there is shown a preferred form of a valve apparatus of the present invention. The four way transfer valve 10 has a body member 12 into which two upper fittings, 14 and 16, and two similar lower fittings, 18 and 20, are threadedly connected. The fittings connect the body member 12 with four fluid conduits, as shown in FIGURE 1. A mounting plate 22, an end plate 24, and a number of lapped plates are secured in clamped relation by tie bolts to form a laminated structure, as described hereinbelow.

Body member 12 has a central bore in which a rotor or pintle 32 is rotatably mounted. The pintle is mounted on a shaft 34 to which an armature (not shown) is secured. The armature is within a stator 36, which has a plurality of control windings 38 for governing the rotational position of the armature and rotor 32 in accordance with electrical input intelligence. The input intelligence or control impulses may be supplied by any of various conventional instrumentalities. A conventional amplifier 40 is utilized with the embodiment shown for increasing the strength of relatively weak electrical input, and is connected to the field windings 38 in a conventional manner. The rotor is maintained in a predetermined rotational position when the inputs to the winding are balanced. Unbalance in the electrical inputs rotates the rotor to a position where the torque forces on it are balanced, in a manner well known in the art.

The preferred form of the present invention is a four-way valve adapted for controlling flow or pressure to and from a controlled instrumentality.

As shown in FIGURES 2 and 3, the transfer valve of the present invention utilizes a modular laminated construction wherein groups of lamination plates are identical or similar. The construction is generally symmetrical in that each respective type of plate is in the same relative position on each side of the valve. As shown in FIGURES 2 and 3, eight lamination plates are positioned between the mounting member 22 and the body member 12. Eight similar plates are symmetrically arranged between body member 12 and end member 24. Separator plates 58, 60 and 62 are identical. Plates 64 are distributor plates, portions of which are shown in detail in FIGURE 4. Plates 66, 68, 70 and 72 are manifold plates which are similar to each other except that the bridging aperture of each has a specific configuration, as described hereinbelow. FIGURE 2 shows the symmetric arrangement of plates relative to body member 12, each plate on one side of the body member being designated by the same reference numeral as the corresponding plate on the opposite side. Hereafter, description relative to the structure of one side of the valve is to be understood as generally applicable to the structure of the other side, except insofar as distinctions are indicated.

From the foregoing, it will be understood that a modular laminated structure is provided which utilizes similar plates of simple construction, and it will be understood that certain of the plates are identical and that others are very similar. Economy of fabrication is therefore achieved.

Disposed circularly about bore 30 and body member 12 are six bolt holes, 78 to 88. Body mounting member 22, end member 24 and each of the plates 58 to 72 have similar sets of circularly arranged holes adapted to receive four tie-bolts, 78, 80, 82 and 84, and to accommodate a pair of precision aligning screws 86 and 88. The holes through which each bolt and precision screw extends are designated in the drawings by the same numerals as the particular bolt or screw.

The precision alignment screws 86 and 88, extending through precision holes 86 and 88, maintain precise alignment of the plates and other members in the assembled laminated structure. Precision alignment is provided by this means alone, without requiring a high degree of precision in the other holes and components for this purpose. Precision assembly and economy of construction are thus provided.

Each of the tie bolts and precision screws has a circular head adapted to fit within a counter-bore 96 in mounting member 22, as shown in FIGURE 2. Rotor shaft 34 extends through a central opening in each plate or member and through a similar opening 100 in a retainer disc 102, which in the assembled construction is disposed over the heads of the precision screws and tie bolts. Mounting member 22 is provided with a counter-bore 104 in which a sealing ring 106 is fitted. Retainer disc 102 has a bore 108 and a counter-bore 110 defined about opening 100. A resilient seal 112 is fitted in bore 108. A bearing 114 is seated in counter-bore 110 to accommodate rotor shaft 34. Retainer disc 102 is secured to mounting member 22 by six screws 120 which extend through circularly arranged holes in the disc.

Additional tie bolts 122, 124, 126, 128, 130 and 132 are accommodated by correspondingly numbered registering holes in mounting member 22, body member 12, end member 24 and each of the lamination plates.

A feature of this invention is that each of the members 22, 12 and 24, together with each of the lamination plates, is lapped to a precision finish, so that when these parts are clamped together by the tie bolts, pressure sealing is provided. The necessity for special sealing elements is thereby eliminated with resultant economy and simplicity of construction.

Referring to FIGURE 4, rotor or pintle 32 is shown as having four axial ports, 136, 138, 140 and 142. The ports are symmetrically arranged in angularly spaced relation. The pintle has two flanges 146 and 148, which define an angular V-shaped channel. A ball bearing race is formed between the channel thus formed and the interior of the bore 30, the bore being formed with precision for this purpose. A plurality of ball bearings 154 is disposed in the race and provides radial bearing means for the rotor. The flange peripheries do not extend to the interior of the bore, and the ball bearings maintain the pintle and the interior of the bore with spaced relation. The bore, the pintle and distribution plates 64 cooperate to form the ball race at each end of the pintle. A plurality of ball bearings is disposed in each of these races to provide axial thrust bearings at the ends of the pintle.

From the foregoing description, it will be understood that radial and axial bearings are provided for the pintle by the ball bearings and that the pintle is thereby rotatably mounted in a floating condition. It will also be understood that rotational friction is minimized by this construction. It will be observed and understood that, the rotor ports being disposed radially within the ball bearing mounting and therefore being only short distances from this mounting, a high degree of precision positioning of the rotor ports relative to their corresponding control elements is maintained under varying pressures, loadings and temperatures.

Each of the lamination plates, each distributor plate 64 and body member 12 have a number of similarly arranged passage holes. The holes cooperate in the assembled structure to provide flow passages through the laminated body structure, each hole in an element registering with the correspondingly positioned holes in the other elements to define a passage. Each plate and member has eight circularly arranged holes, designated by numerals 156 to 170, and four additional passage holes 172, 174, 176 and 178, two of which are positioned on either side of the plate or member. Each hole is designated by the same reference numeral in each of the plates and members. The passage formed by each set of registering holes is designated by the same reference numeral as the holes which define it.

Manifold plates 66, 68, 70 and 72 have bridging apertures 200, 202, 204 and 206, respectively. Each bridging aperture interconnects three of the passage holes in its plate and thus interconnects the passages corresponding with these holes. Each such aperture has a crescent or C-shaped portion and an adjoining linear or straight portion. Bridging aperture 200 in plate 66 interconnects passages 172, 162 and 170. In manifold plate 68 bridging aperture 202 interconnects passages 176, 158 and 166.

Bridging aperture 204 in plate 70 interconnects passages 174, 160 and 168, and aperture 206 in plate 72 connects passages 156 and 164 with passage 178. It will be observed that each bridging aperture provides lateral porting within the thickness of one lamination plate. A high degree of lateral porting in a short axial distance is thus provided.

Appropriate passages are provided in body member 12 for connecting fitting 14 with passage 172, for interconnecting fitting 16 and passage 176, for connecting fitting 18 with passage 174, and for communication between fitting 20 and passage 178.

Referring to FIGURES 2, 4 and 5, a circular recess 182 is defined in each distributor plate 64 and is in confronting relation with an end surface of pintle 32. Symmetrically arranged within this recess are four angularly spaced annular control elements 186, 188, 190 and 192. These annular elements are in sliding abutment with the pintle end surface. Each annular element forms a boss about an opening extending through the element. Each element has an enlarged portion which seats against a shoulder formed by an appropriate counter-bore in the distributor plate. A space is defined in the recess between each pair of control elements by the distributor plate and the end surface of the pintle. Passages 156, 160, 164 and 168 in the laminated structure communicate with these spaces, as shown. Passages 158, 162, 166 and 170 extend through control elements 188, 190, 192 and 186, respectively.

Each annular control element is adapted for peripheral registration with the perimeter of a pintle port. As shown, the annular elements are in the same symmetric angularly spaced arrangement as the pintle ports. It will therefore be observed that, when the pintle is in the proper rotational position, four annular elements are in eclipsing registration with the four ports at each end of the pintle, and flow through the ports and into the aforementioned spaces is prevented. For convenience of reference, this rotational position is herein referred to as the neutral position of the rotor. The neutral position is obtained when the electrical input to the control windings is balanced, as hereinbefore mentioned.

From the foregoing description, and from FIGURES 2 and 4, it will be understood that four valve mechanisms or valve devices are provided at each end of the pintle. With the pintle ports in eclipsing registration with their corresponding annular control elements, flow is prevented between the pintle ports and the spaces defined as hereinbefore described. Upon rotation of the pintle from this eclipsing position, each port moves from a fully eclipsing position to a position of partial eclipse. A crescent-shaped flow aperture is thus provided which permits flow from the port past the periphery of the annular control element into the space between control elements, and thus to the passage which communicates with this space. For example, with reference to FIGURE 9, when port 136 is in eclipsing registration with control element 192, there is no flow between the port and passage 164. With the pintle rotated clockwise to the position shown in FIGURE 10, the periphery of port 136 moves from the rim of annular element 192 to provide a crescent-shaped aperture. Fluid may flow past the rim and side surface of the annular element, as though over a cliff, and into the space between annular elements 192 and 190 thus gaining free access to passage 164. Similarly, counterclockwise movement of the pintle, as indicated in FIGURE 11, produces a crescent-shaped aperture which provides relatively free flow from the port to passage 168. It will be observed that relatively free flow is thus also permitted from the opening or passage in the annular control element into the port, and thence from the port through the space between control elements and into the passage.

It will be understood from the geometric relations of the parts that movement of a port between full and partial eclipse provides a very smooth initiation or termination of flow from the port to a passage in the valve. It will also be understood that the space between each pair of control elements permits free flow between a port and a passage immediately on movement of the port from a fully eclipsing position. It will be further understood that the flow thus effected is proportional to the rotational movement of the pintle. Thus, means are provided for proportional control of the flow in each of several passages or conduits by the proportional positioning of a rotatable member in accordance with input intelligence.

As hereinbefore indicated, the transfer valve of this invention is adapted for governing flow through conduits in communication with the valve. In FIGURE 1, the valve is shown connected for governing flow to and from the actuator cylinder 42. Flow or pressure from the valve moves through the conduit 46 to one end of the cylinder to move the piston in one direction, and moves through conduit 48 to the opposite end of the cylinder to move the piston in the opposite direction. Fluid or pressure is relieved from the cylinder to the valve through coupling 46 or 48, depending upon the direction of piston movement.

The valve of this invention may be utilized for regulating flow of either gas or liquid. It is generally preferred that gas be utilized in view of the faster response which is obtainable.

In the operation of the valve of this invention, rotational movement of the pintle results in a multiple valving action whereby the pintle initiates, regulates and stops flow through each of the plurality of passages which are defined in the laminated structure and which communicate with the pintle.

FIGURES 6, 7 and 8 schematically illustrates the flow circuits through the valve which correspond to the pintle positions shown in FIGURES 9, 10 and 11, respectively. Each of these figures represents a view taken in the direction of the arrow in FIGURE 1. The views are therefore inward from end member 24 and are opposite in direction from the view taken in FIGURE 3.

FIGURE 9 illustrates the conditions when the pintle ports are in eclipsing registration with the annular control elements. The valve is in the neutral position hereinbefore defined. Pressure entering through fitting 16 enters the passage 176 defined in the laminated structure. Through passage 176 the pressure is communicated to bridging aperture 202 in manifold plate 68, from which it passes through passages 158 and 166. Thence the pressure is circuited to ports 136 and 140 of the pintle. No fluid flow through the ports occurs because the ports register with their corresponding annular control elements. Simultaneously, pintle ports 138 and 142 are in registration with annular elements 186 and 190 and are in communication with the passages 170 and 162, which are interconnected by bridging aperture 200 in manifold plate 66 with passage 172, which communicates through fitting 14 with an external circuit.

In the embodiment herein described, pintle ports 136 and 140 are in communication with fitting 16 and ports 138 and 142 are in communication with fitting 14, regardless of the rotational position of pintle 32. Therefore, the pressure or flow circuits described above are at all times in effect, irrespective of pintle position.

When the pintle is rotated clockwise to the position illustrated in FIGURE 10, flow is permitted from each pintle port to the space adjacent (in a clockwise direction) to the cooperating control element. As shown in FIGURE 7, flow from bridging aperture 202 to pintle ports 136 and 140 passes through passages 156 and 164 to bridging aperture 206 in plate 72, and thence through passage 178 and fitting 20 to the cylinder 42.

Simultaneously, fluid or pressure is released or vented from the opposite end of the cylinder through fitting 18. The circuit may be traced in FIGURE 7 from the fitting through passage 174 to bridging aperture 204 in plate 70, where it branches into passages 160 and 168. From pintle ports 138 and 142 the path is through passages 170 and 162 to bridging aperture 200 in manifold plate 66, and thence through passage 172 to fitting 14.

From the foregoing, it will be understood that fluid or pressure entering the valve at fitting 16 branches into two passages, one on each side of the valve. Each of these branches then divides into two circuits or paths on each side of the valve, each of which is governed by an individual valve mechanism at an end of the pintle. These paths join in a passage on each side of the valve which communicates with fitting 20.

In FIGURE 11 are shown the circuits which are operative when the pintle is rotated in a counterclockwise direction. Pressure entering at fitting 16 enters a passage 176 on each side of the valve and passes to bridging aperture 202 in manifold plate 68, from which it moves through passages 158 and 166 to pintle ports 136 and 140. From the ports it passes through passages 160 and 168 to bridging aperture 204 in plate 70, and thence through passage 174 to fitting 18. From there it communicates with an end of the hydraulic cylinder. Fluid or pressure is released from the opposite end of the cylinder through coupling 46 to fitting 20 and passes outwardly from the center of the valve through passage 178 to bridging aperture 206, from which it branches through passages 156 and 164 to pintle ports 138 and 142. From these ports it passes through passages 162 and 170 to bridging aperture 200 in manifold plate 66. From this bridging aperture it passes through passage 172 to fitting 14.

From the foregoing, it will be observed that when the valve rotor is in a neutral position there is no flow to or from either end of the actuator cylinder. When the valve is rotated in one direction, there is flow to one end of the cylinder and from the other end. When the valve is rotated in the opposite direction, there is flow to the opposite end of the cylinder. Because the passages remain interconnected as hereinbefore described, the valve will operate in a reverse manner if the pressure and venting connections are reversed. It will be observed that the forces on opposite ends of the valve rotor are always balanced, because the flow into and out of the pintle is always controlled by valves in two paths at each end of the pintle. These valves being diametrically disposed, torque forces tending to rotate the valve neutralize each other. Therefore the rotor is responsive to relatively slight input impulses.

From the foregoing, those skilled in the art will observe that the valve of this invention has a number of novel features. Those skilled in the art will realize that the invention achieves each of the objects mentioned hereinbefore and that it realizes all of the advantages mentioned herein.

Although a specific embodiment of the present invention has been described and illustrated in detail, it is to be clearly understood that the same is by way of illustration and example only; it is to be undersood that the invention is not to be limited thereto, as many variations will be readily apparent to those versed in the art and the invention is to be given its broadest possible interpretation within the scope of the appended claims.

The inventor claims:

1. In a valve construction, the combination comprising a rotor having at least one port therein, a control element abutting an end of the rotor and registrable with the port, said control element defining an opening, means cooperating with said rotor and said control element to define a space, and means defining a passage communicating with said space, whereby a valve is provided for regulating flow between said port and said passage in accordance with rotational movement of the rotor.

2. In a valve construction, the combination comprising a rotor having at least one port extending to the ends thereof, a control element abutting each end of the rotor and registrable with said port, each of said control elements defining an opening, means defining a passage communicating with said opening, means cooperating with said rotor and with each of said control elements to define a space, and means defining a passage communicating with said space, whereby a valve is provided at each end of said rotor for regulating flow between said port and said passage in accordance with rotational movement of the rotor.

3. In a valve construction, the combination comprising a rotor having at least two diametrically disposed axial ports, at least two diametrically opposed control elements abutting an end of the rotor and adapted to register with said ports, each of said control elements defining an opening, means cooperating with each of said control elements to define a space, and means defining a passage communicating with each said space, whereby at least two valve mechanisms are provided at said rotor end for regulating flow between said ports and said passages in accordance with rotor movement.

4. In a valve construction, the combination comprising a rotor having at least two diametrically disposed axial ports extending to the ends thereof, at least two diametrically opposed control elements abutting each of said ends and adapted to register with said ports, each of said control elements defining an opening, means cooperating with said rotor and each of said control elements to define a space, and means defining a passage communicating with said space, whereby at least two valves are provided at each end of said rotor for regulation of flow between said ports and passages in accordance with rotor movement.

5. In a valve construction, the combination comprising a rotor having four symmetrically angularly spaced axial ports extending to an end thereof, four symmetrically angularly spaced control elements abutting an end of the rotor and adapted to register with said ports, each of said control elements defining an opening, means cooperating with said rotor and with each of said control elements to define a space, and means defining a passage communicating with said space, whereby four valve mechanisms are provided at said end of the rotor for regulation of flow between the ports and passages in accordance with rotor movement.

6. An apparatus according to claim 5, and further including four similar control elements at the end of the rotor opposite said four control elements, means cooperating with said rotor and with each of said similar control elements to define a space, and means defining a passage communicating with each said space, whereby four valves are provided at each end of said rotor for regulation of flow in accordance with rotor movement.

7. A valve device comprising a rotor having at least one port therein displaced from the axis thereof, an annular control element adapted for eclipsing registration with said port, means defining a passage communicating with a space adjacent to the annular element, and means for rotating the rotor to effect a partial eclipse between the port and the annular element, whereby relatively free flow is quickly initiated between said port and said passage.

8. A valve device comprising a rotor having a pair of ports therein displaced from the axis thereof, a pair of diametrically disposed annular control elements adapted for eclipsing registration with said ports, means defining a passage communicating with a space adjacent to each of said annular elements, and means for rotating the rotor to effect a partial eclipse between each of said ports and a corresponding one of said annular elements, whereby a pair of valve mechanisms is provided for quickly initiating relatively free flow between said ports and said passages.

9. A valve device comprising a rotor having a pair of ports extending therethrough to the ends thereof, a pair of annular control elements at each of said rotor ends adapted for eclipsing registration with said port, means defining a passage communicating with a space adjacent to each of said annular elements, and means for rotating the rotor to effect a partial eclipse between each of said ports and a corresponding one of said annular elements, whereby two valve mechanisms are provided at each end of said rotor and forces produced on said rotor by pressures in said ports and passages are balanced.

10. In a valve construction, means defining a bore, a valve rotor positioned in said bore, said rotor having at least one axially extending port, control means adjacent to an end of the rotor for controlling flow through the port in accordance with rotational movement of the rotor, said rotor and said means defining a bore cooperating to define ball races between the rotor and the interior of said bore, and a plurality of ball bearings in said races forming radial and thrust bearings, whereby said rotor may be operated in a floating condition and relatively precise positioning of said port relative to said control means is provided during valve operation.

11. In a valve construction for controlling flow in conduits communicating therewith, a rotor having a plurality of ports, means defining a plurality of openings confronting an end of the rotor, said openings being adapted for respective engagement with said ports, and a plurality of plates secured together to form a laminated structure, said plates having registering holes cooperating with said openings to define a plurality of passages in said structure, at least one of the plates having a bridging aperture interconnecting one of said passages with one of said conduits through another of said passages, and means for rotating said rotor to control the interconnection of respective ports with respective passages, whereby flow through said conduits is controlled by rotational movement of said rotor.

12. A valve construction according to claim 11 wherein said plurality of plates includes a plurality of manifold plates and a plurality of separator plates, certain of said registering holes therein being circularly arranged, each of said manifold plates defining a bridging aperture interconnecting two of the circularly arranged holes with a third hole in communication with one of said conduits, whereby two of said passages are interconnectable with one of said conduits and with one of said rotor ports on rotation of said rotor.

13. In a valve construction having interconnecting passages, the combination comprising a plurality of manifold plates, and a plurality of separator plates interposed among the manifold plates, said manifold plates and separator plates being attached together to form a laminated structure, each of said plates having a plurality of holes registrable with corresponding holes in other of said plates to define a plurality of passages, each of said manifold plates defining a bridging aperture interconnecting at least two of said holes therein, said separator plates cooperating with each of said manifold plates to define a bridging conduit interconnecting at least two of said passages by means of said bridging aperture, whereby a plurality of interconnecting fluid passages is provided in said valve construction.

14. In a valve for controlling pressure to and from an instrumentality governed by said pressure, the combination comprising valve body means defining a bore, a rotor in said bore, said rotor having axial ports extending to the ends thereof, means in said body means defining two inlet passages to each of said rotor ends, means in said body means defining two flow passages from each of said rotor ends, and control means at each of said rotor ends for cooperating with said rotor ports to regulate flow through said passages in accordance with movement of said rotor, said means defining passages to each rotor end being diametrically positioned relative to said rotor and said means defining said passages from each rotor end being diametrically positioned, whereby forces on said rotor produced by pressures in said ports and passages are balanced.

15. In a valve construction, the combination comprising a valve body having a bore therein, a pintle rotatably mounted in the bore, said pintle having at least two diametrically disposed ports extending therethrough parallel to the rotor axis, means at each end of the pintle defining openings adapted to engage said rotor ports, means defining diametrically disposed passages for fluid communication with said openings at each rotor end, and means for rotating said pintle to control flow through said passages in accordance with the positions of said ports relative to said openings, whereby axial and transverse forces produced on said pintle by pressures in said passages and ports are substantially balanced.

16. In a valve apparatus, the combination comprising means defining a bore, a pintle rotatably mounted in the bore, said pintle having at least one port displaced radially from the axis thereof and extending to an end thereof, means defining a recess confronting said end, means defining a first passage communicating with said recess, a control element disposed in the recess and defining an opening for a second passage, said control element abutting said pintle and being adapted for peripheral registration with said port, and means for rotating said pintle to move said port from said registration, whereby relatively free flow is quickly initiated between said first and second passages through said recess.

17. The valve apparatus according to claim 16 wherein said control element is annular in configuration and is adapted for eclipsing registration with said port.

18. In a valve apparatus, the combination comprising means defining a bore, a pintle rotatably mounted in the bore, said pintle having a plurality of symmetrically angularly spaced axial ports extending to an end thereof, means defining a recess confronting said pintle end, a plurality of symmetrically angularly spaced annular control elements disposed in said recess, said annular control elements being adapted for eclipsing registration with said pintle ports, said pintle and said annular elements cooperating to define a space in said recess between each pair of annular elements, means defining a passage communicating with each said space, and means for rotating said pintle to move said ports relative to said annular elements, whereby flow control mechanisms for a plurality of flow paths are provided at the end of the pintle and forces produced on said pintle by pressures in said ports and passages are balanced.

19. In a valve apparatus, the combination comprising means defining a bore, a pintle rotatably mounted in the bore, said pintle having a plurality of symmetrically angularly spaced axial ports extending to the ends thereof, means defining a recess confronting each of said ends, a plurality of symmetrically angularly spaced annular control elements disposed in each of said recesses, said annular control elements being adapted for eclipsing registration with said pintle ports, said pintle and said annular elements cooperating to define a space in said recess between each pair of annular elements, means defining a passage communicating with each said space, and means for rotating said pintle to move said ports relative to said annular elements, whereby flow control mechanisms for a plurality of flow paths are provided at each end of the pintle and axial and transverse forces produced on said pintle by pressures in said ports and passages are balanced.

20. A transfer valve comprising body means defining a bore, a rotor mounted in the bore and having at least two diametrically disposed axial ports extending to the ends thereof, at least two diametrically disposed control elements abutting each of said ends adapted to register with said ports, each of said control elements defining an opening, means cooperating with said rotor at each of said control elements to define a space, a plurality of plates secured together to form a laminated structure, said plates having registering holes cooperating with said openings to define a plurality of passages in such structure, at least one of the plates having a bridging aperture interconnecting one of said passages with another of said passages, said rotor and said body means cooperating to define ball races between the rotor and the interior of said bore, and a plurality of ball bearings in said races to provide radial and thrust pintle bearings, and means for rotating said rotor to control the interconnecting of said ports with said passages, whereby flow through said passages is controlled by rotational movement of said rotor.

21. A transfer valve for controlling flow in conduits communicating therewith, said transfer valve comprising body means defining a bore, a rotor mounted in said bore and having at least two diametrically disposed axial ports extending to the ends thereof, at least two diametrically disposed control elements abutting each of said ends and adapted to register with said ports, each of said control elements defining an opening, means cooperating with said rotor and with each of said control elements to define a space, a plurality of manifold plates, a plurality of separator plates interposed among the manifold plates, said manifold plates and separator plates being attached together to form a laminated structure, each of said plates having a plurality of holes registerable with corresponding holes in other of said plates to define a plurality of passages, each of said passages communicating with one of said openings, each of said manifold plates defining a bridging aperture interconnecting at least two of said holes therein, said separator plates cooperating with each of said manifold plates to define a bridging conduit interconnecting at least two of said passages by means of said bridging aperture, said rotor and said body means cooperating to define ball races between the rotor and the interior of said bore, a plurality of ball bearings in said races to provide radial and thrust bearings, said ball bearings being retained by said laminated structure, and means for rotating said rotor to control interconnection of said ports and said passages, whereby flow through said conduits and passages is controlled by rotational movement of said rotor.

22. A transfer valve comprising means defining a bore, a pintle rotatably mounted in the bore, said pintle having a plurality of symmetrically angularly spaced axial ports extending to the ends thereof, means defining a recess confronting each of said ends, a plurality of symmetrically angularly spaced annular control elements disposed in each of said recesses, said annular control elements being adapted for eclipsing registration with said pintle ports, said pintle and said annular elements cooperating to define a space in said recess between each pair of annular elements, means defining a passage communicating with each said space, a plurality of plates secured together to form a laminated structure, said plates having registering holes cooperating with said openings to define a plurality of passages in said structure, at least one of the plates having a bridging aperture interconnecting one of said passages with one of said conduits through another of said passages, said pintle and said body means cooperating to define ball races between a rotor and the interior of said bore, a plurality of ball bearings in said races to provide radial and thrust bearings, whereby flow through said passages and said conduits is controlled by rotational movement of said pintle.

References Cited in the file of this patent

UNITED STATES PATENTS

| | | |
|---|---|---|
| 1,519,670 | Danstrup | Dec. 16, 1924 |
| 2,198,543 | Lauterbach | Apr. 23, 1940 |
| 2,524,234 | Schenk | Oct. 3, 1950 |
| 2,675,830 | Vuillemin | May 20, 1954 |
| 2,736,339 | Asbury | Feb. 28, 1956 |
| 2,807,280 | Kittredge | Sept. 24, 1957 |

FOREIGN PATENTS

| | | |
|---|---|---|
| 285,992 | Italy | Mar. 28, 1931 |
| 575,917 | Great Britain | Mar. 11, 1946 |
| 581,814 | Great Britain | Oct. 25, 1946 |
| 1,002,174 | Germany | Mar. 15, 1952 |
| 1,095,864 | France | Dec. 29, 1954 |